United States Patent
Clegg

(10) Patent No.: US 8,990,278 B1
(45) Date of Patent: Mar. 24, 2015

(54) CIRCUITRY FOR COMPUTING MATHEMATICAL FUNCTIONS

(75) Inventor: Christopher M. Clegg, Peebles (GB)

(73) Assignee: Xilinx, Inc., San Jose, CA (US)

( * ) Notice: Subject to any disclaimer, the term of this patent is extended or adjusted under 35 U.S.C. 154(b) by 784 days.

(21) Appl. No.: 13/275,130

(22) Filed: Oct. 17, 2011

(51) Int. Cl.
*G06F 1/02* (2006.01)
*G06F 7/38* (2006.01)
*G06F 7/552* (2006.01)
*G06F 7/544* (2006.01)

(52) U.S. Cl.
CPC ................................ *G06F 7/544* (2013.01)
USPC ........... 708/277; 708/272; 708/500; 708/502; 708/605

(58) Field of Classification Search
USPC ............. 708/270, 277, 500, 502, 605
See application file for complete search history.

(56) References Cited

U.S. PATENT DOCUMENTS

| | | | | |
|---|---|---|---|---|
| 5,862,059 | A * | 1/1999 | Matula et al. | 708/270 |
| 5,870,321 | A * | 2/1999 | Konrad | 708/490 |
| 6,115,733 | A * | 9/2000 | Oberman et al. | 708/654 |
| 6,240,433 | B1 * | 5/2001 | Schmookler et al. | 708/270 |
| 6,256,653 | B1 * | 7/2001 | Juffa et al. | 708/290 |
| 7,191,204 | B1 * | 3/2007 | Ogata | 708/654 |
| 7,599,982 | B1 * | 10/2009 | Rarick | 708/654 |
| 7,747,667 | B2 * | 6/2010 | Lutz et al. | 708/502 |
| 2002/0143840 | A1 * | 10/2002 | Krouglov et al. | 708/654 |
| 2006/0242220 | A1 * | 10/2006 | Shehata et al. | 708/650 |
| 2012/0166509 | A1 * | 6/2012 | Sperber et al. | 708/502 |

OTHER PUBLICATIONS

F. de Dinechin and A. Tisserand, "Multipartite Table Methods," IEEE Trans. Computers, vol. 54, No. 3, pp. 319-330, Mar. 2005.*
S. Lachowicz and H.-J. Pfleiderer, "Fast evaluation of nonlinear functions using FPGAs," Proc. 4th Intl. Symposium on Electronic Design, Test and Applications, Jan. 2008.*
N. Takagi, "Powering by a Table Look-Up and a Multiplication with Operand Modification," IEEE Trans. Computers, vol. 47, No. 11, pp. 1216-1222, Nov. 1998.*
Ercegovac, Milos D. et al., "Reciprocation, Square Root, Inverse Square Root, and Some Elementary Functions Using Small Multipliers," *IEEE Transactions on Computers*, Jul. 2000, pp. 628-637, vol. 49, No. 7, IEEE, Piscataway, New Jersey, USA.
Ito, Masayuki et al., "Efficient Initial Approximation for Multiplicative Division and Square Root by a Multiplication with Operand Modification," *IEEE Transactions on Computers*, Apr. 1997, pp. 495-498, vol. 46, No. 4, IEEE, Piscataway, New Jersey, USA.

* cited by examiner

*Primary Examiner* — Chuong D Ngo
*Assistant Examiner* — Matthew Sandifer
(74) *Attorney, Agent, or Firm* — LeRoy D. Maunu; Lois D. Cartier

(57) ABSTRACT

Methods and circuitry for evaluating reciprocal, square root, inverse square root, logarithm, and exponential functions of an input value, Y. In one embodiment, an approximate value, RA, of the reciprocal of Y is generated. One Newton-Raphson iteration is performed as a function of RA and Y, resulting in a truncated approximate value, R. R is multiplied by Y and 1 is subtracted, resulting in a reduced argument, A. A Taylor series evaluation of A is performed, resulting in an evaluated argument, B. B is multiplied by a post-processing factor for the final result.

20 Claims, 5 Drawing Sheets

CIRCUITRY FOR COMPUTING MATHEMATICAL FUNCTIONS

FIELD OF THE INVENTION

One or more embodiments generally relate to circuits for computing reciprocal, square root, inverse square root, logarithm, and exponential functions.

BACKGROUND

The reciprocal, square root, inverse square root, logarithm, and exponential functions are used often in digital signal processing and many other applications. There are many known methods for computing these functions, examples of which include Newton-Raphson and argument reduction with Taylor Series expansion. The Newton-Raphson method entails obtaining an initial approximation of the function, such as with a look-up table, and performing a number of recurrence iterations. For example, the Newton-Raphson recurrence iteration for the reciprocal of x is:

$$z(n+1)=z(n)*(2-x*z(n))$$

where $z(n)$ is the computed reciprocal of x in the $n^{th}$ iteration.

Computing the reciprocal function using the Newton-Raphson method generally requires two multipliers and one adder per iteration. The rate of convergence is quadratic, which means the precision of the result of each iteration is twice as many bits as the precision of the starting point. The size of the multipliers and adders needed for each iteration increases proportionally with each iteration. The Newton-Raphson method also requires an initial approximation of the reciprocal function. The accuracy of the initial approximation is important for rapid convergence in the minimum number of iterations. One approach for obtaining an initial approximation is described by Ito et al. in "Efficient Initial Approximation for Multiplicative Division and Square Root by a Multiplication with Operand Modification" (IEEE Transactions on Computers, vol. 46, No. 4, April 1997).

Ercegovac et al., in "Reciprocation, Square Root, Inverse Square Root, and Some Elementary Functions Using Small Multipliers (IEEE Transactions on Computers, vol. 49, No. 7, July 2000), describe a method based on argument reduction and series expansion. The method allows fast evaluation of various functions at single and double precision.

SUMMARY

In one embodiment, a method is provided for evaluating a function of an input value, Y. The method includes generating an approximate value, RA, of the reciprocal of Y by an initial approximation circuit. One Newton-Raphson iteration is performed by a Newton-Raphson circuit as a function of RA and Y. The result is a truncated approximate value, R. A reduction circuit multiplies R by Y and subtracts 1, resulting in a reduced argument, A. A Taylor series evaluation circuit performs a Taylor series evaluation of A, resulting in an evaluated argument, B. A first multiplier circuit multiplies B by a post-processing factor and outputs a final product.

In another embodiment, a circuit is provided for evaluating a function of an input value, Y. The circuit includes an initial approximation circuit that is configured and arranged to generate an approximate value, RA, of the reciprocal of Y. A Newton-Raphson circuit is coupled to the initial approximation circuit. The Newton-Raphson circuit is configured and arranged to perform one Newton-Raphson iteration as a function of RA and Y and output a truncated approximate value, R. A reduction circuit is coupled to the Newton-Raphson circuit, the reduction circuit configured and arranged to multiply R by Y and subtract 1 and output a reduced argument, A. A Taylor series evaluation circuit is coupled to the reduction circuit and is configured and arranged to perform a Taylor series evaluation of A and output an evaluated argument, B. A first multiplier circuit is coupled to the Taylor series evaluation circuit. The first multiplier circuit is configured and arranged to multiply B by a post-processing factor and output a final product.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings, in which.

DETAILED DESCRIPTION

An advantage of the Newton-Raphson method is its simplicity and regular structure. Disadvantages include the large multipliers that are required in later iterations and the need for a method to obtain the initial estimate. A lookup table is a simple solution, but requires a read-only memory (ROM).

The method described by Ito for single precision (24-bit mantissa), requires one ROM of size $2^{12}*26=104K$ bits, along with one unsigned multiplier of size 26*27 bits. This method may not be suitable for computing double precision directly because of the large ROM and multiplier that are required. However, it has been recognized that the accuracy of the initial approximation provided by the ROM may be increased with one Newton-Raphson iteration, and the refined approximation may be provided to other more efficient methods of computing the final result.

The method described by Ercegovac allows use of smaller multipliers and a small ROM for single precision calculations. However, for double precision calculations the ROM is quite large. For example, for double precision calculations a ROM that is $2^{15}*16=524,288$ bits may be required. The required ROM may be too large for implementations in which ROM availability is limited. One or more embodiments address issues associated with previous approaches for computing a reciprocal function.

In one embodiment, an approximation of the reciprocal of an input value is generated by an approximation circuit. One iteration of the Newton-Raphson method is applied to the approximated reciprocal of the input value by a Newton-Raphson circuit. The one Newton-Raphson iteration increases the accuracy of the approximated reciprocal, without reliance on a large ROM, so that the approximated reciprocal may be used in an approach that uses argument reduction with Taylor Series expansion. Thus, double precision calculations are feasible without large ROMs and large multipliers. A reduction circuit multiplies the result of the one Newton-Raphson iteration by the input value and subtracts 1 to generate a reduced argument. A Taylor series evaluation circuit evaluates the desired function of the reduced argument, which results in an evaluated argument. Another multiplier circuit multiplies the evaluated argument by a post-processing factor, and the product is the evaluated function.

Figure 1:
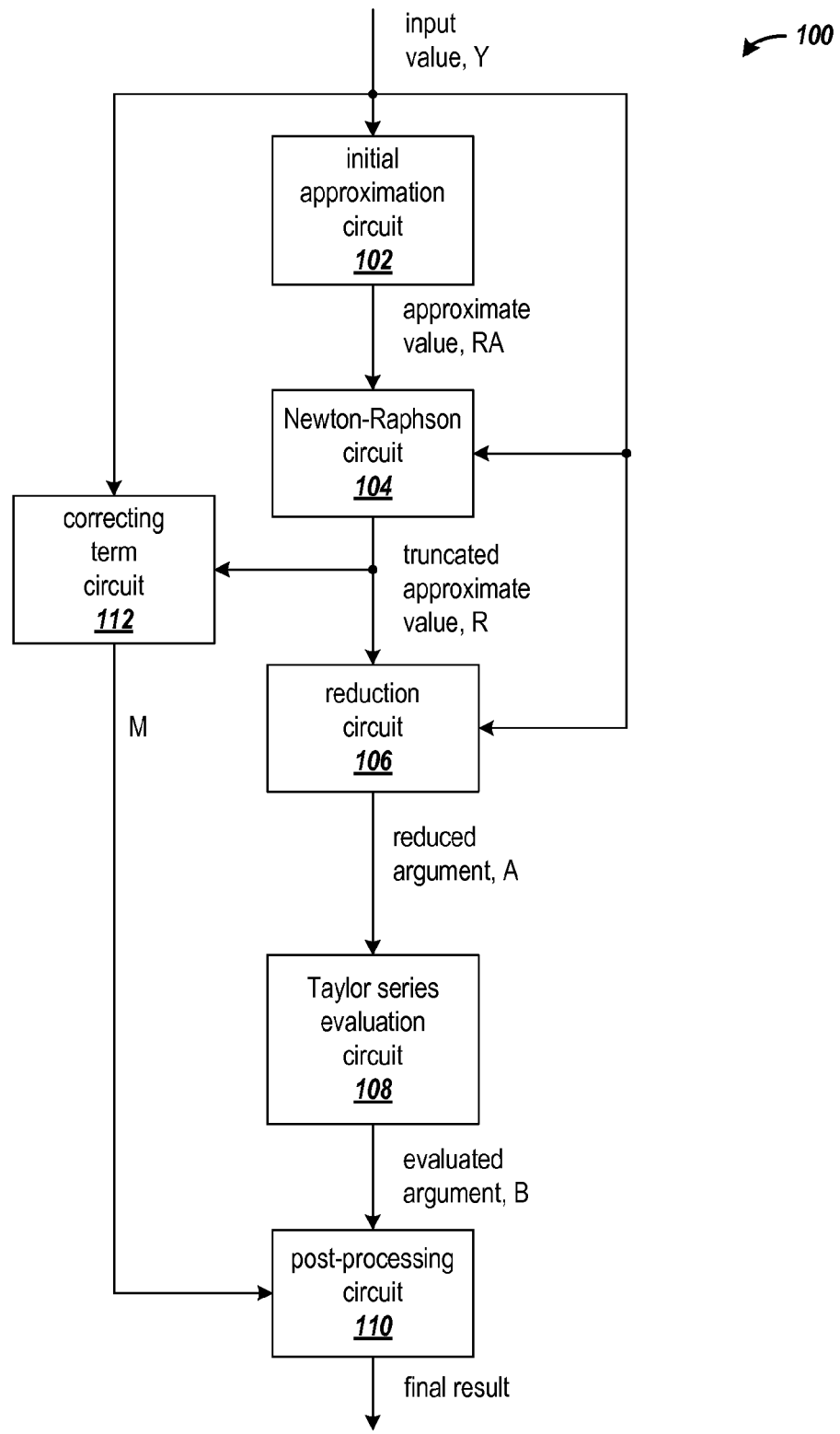
FIG. 1 is a diagram of a circuit for evaluating a function of an input value, Y.

FIG. 1 is a diagram of a circuit 100 for evaluating a function of an input value, Y. The circuitry is applicable to functions such as reciprocal, square root, inverse square root, logarithm, and exponential. The initial approximation circuit 102 generates an approximate value, denoted as RA, of the reciprocal of the input value Y. The initial approximation circuit uses the higher order k bits of the input value Y, denoted $Y^{(k)}$, to generate RA having k+1 bits.

To obtain an approximate value with the desired accuracy, a Newton-Raphson circuit 104 performs one Newton-Raphson iteration on the approximate value RA, resulting in a truncated approximate value, R. R is a more accurate approximation of 1/Y than RA. The one Newton-Raphson iteration permits the circuit to forego having a large ROM for double precision applications. The calculation performed by the Newton-Raphson circuit is $R=RA+RA*(1-(Y^{(k)}*RA))$. The Newton-Raphson circuit truncates the result such that R is k+1 bits.

The reduction circuit 106 multiplies the truncated approximate value R by the input value Y and subtracts 1 to produce reduced argument, A ($A=Y*R-1$). If Y is 4k bits, for example, the value of the 4k bits is multiplied by the k+1 bits of R (R was generated from the higher order k bits of Y), and 1 is subtracted. The resulting reduced argument A is rounded to 4k bits, but the k highest order bits are known to be zero. The k highest order bits are discarded, leaving a 3k bit width of A.

The 3k bits of the reduced argument A are input to the Taylor series evaluation circuit 108. The Taylor series evaluation circuit computes an evaluated argument, B, by performing calculations on three k-bit portions of the 3k bits. The evaluated argument B is input to post-processing circuit 110 for computation of the final result.

The post-processing circuit also receives post-processing factor M from the correcting term circuit 112. For the reciprocal function, the post-processing factor M is the truncated approximate value R. For functions other than the reciprocal function, for example, square root, inverse square root, logarithm, and exponential, the correcting term circuit 112 retrieves the value M from a ROM. For the square root function, the post-processing factor is a reciprocal of a square root of R, and for the inverse square root function, the post-processing factor is a square root of R. For logarithm, $M=-\ln(R)$ (ln denotes natural logarithm). For exponential, $M=\exp(1+A_1 2^{-k})$.

The post-processing circuit 110 multiplies the post-processing factor M by the evaluated argument B to produce the final result. It will be appreciated that various storage elements such as registers and buffers are implied for storing intermediate values in the circuits of FIGS. 1-5 though they are not shown in all instances.

Figure 2:
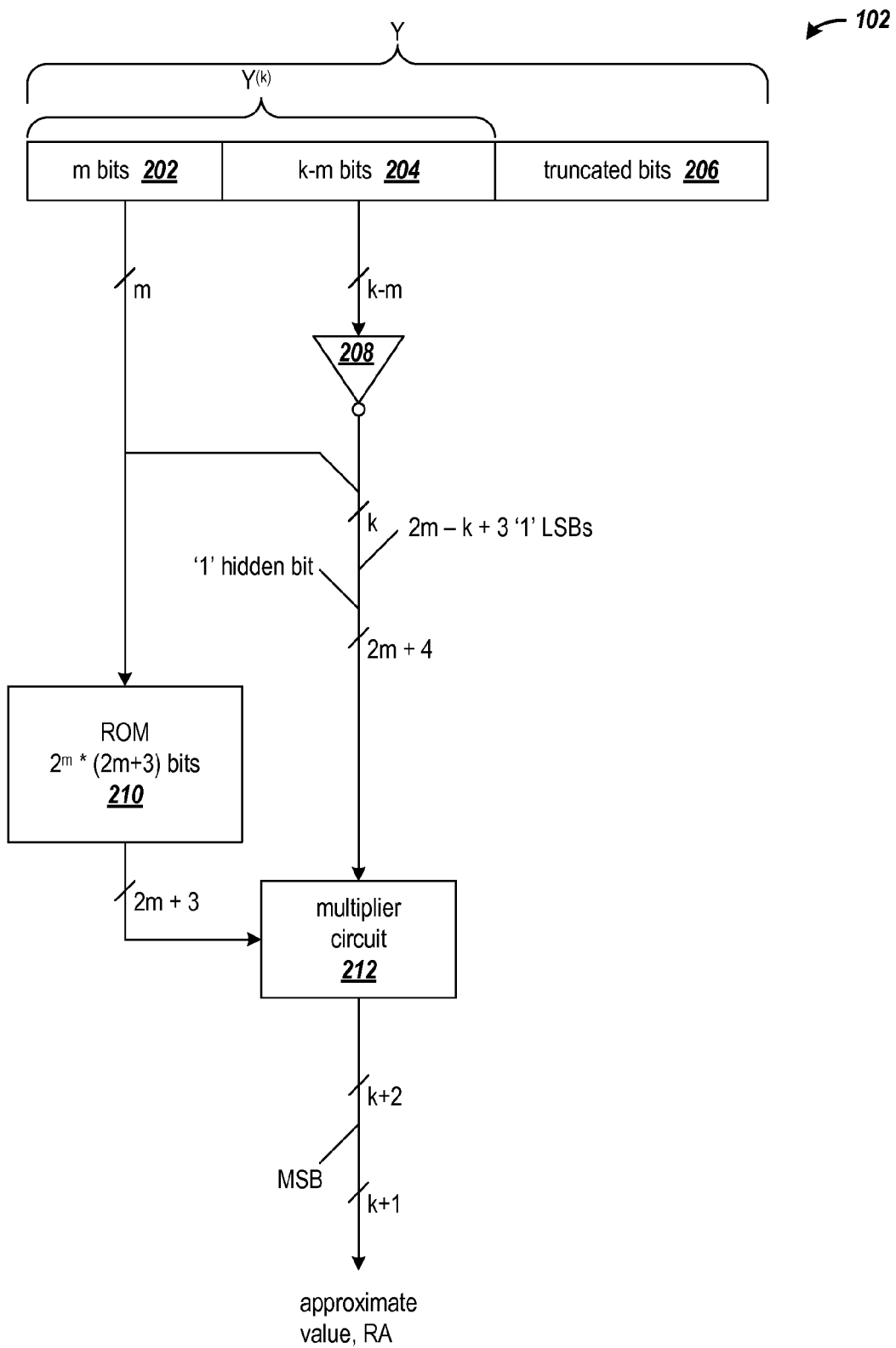
FIG. 2 is a diagram of an initial approximation circuit according to one embodiment.

FIG. 2 is a diagram of an initial approximation circuit 102 according to one embodiment. The initial approximation circuit includes inverter 208, ROM 210, and multiplier 212. The m higher order bits 202 of $Y^{(k)}$ are used to address the ROM 210, which is $2^m*(2m+3)$ bits. For the reciprocal function, for example, the values of the data entries in the ROM are:

$$(1/(p(p+2^{-m})))-(2^{-2m-3}/p^4)$$

rounded to 2m+3 bits, where p=1+the m-bit address of the entry, treated as an unsigned value with no integer bits. The value read from the ROM is 2m+3 bits and is input to the multiplier circuit 212.

The k−m lower order bits of $Y^{(k)}$ are input to inverter 208. The truncated bits 206 of Y are not used by the initial approximation circuit. The m higher order bits of $Y^{(k)}$ are rejoined as higher order bits with the output of the k−m bits from the inverter 208, along with 2m−k+3 "1" bits rejoined as lower order bits, resulting in 2m+4 bits for the second input to the multiplier circuit 212. Thus, the bits of the second input are:

hidden bit "1"|m MSBs of $Y^{(k)}$|k−m LSBs of $Y^{(k)}$, inverted|2m−k+3 "1" LSBs The output from the multiplier is k+2 bits, and the most significant bit (MSB) is ignored, leaving k+1 bits as the approximate value, RA.

In one embodiment, for single precision m=3, k=7, and the ROM is $2^3*9=72$ bits. The inverter is 4 bits, the multiplier is 9 bits by 10 bits, and the resulting approximate value is 8 bits. For double precision, m=7, k=15, and the ROM is $2^7*17=2176$ bits. The inverter is 8 bits, the multiplier is 17 bits by 18 bits, and RA is 16 bits. The maximum error of RA is less than 1 LSB relative to the exact value of $1/Y^{(k)}$. The truncated approximate value R that is input to the reduction circuit 106 must be the exact value of $1/Y^{(k)}$ truncated to k+1 bits. If the exact value and the approximation are close, but lie on either side of a multiple of $2^{-k-1}$, then the truncation will be to different k+1 bit numbers, differing by 1 LSB. In order to address this scenario and obtain R to the desired accuracy, the approximation is refined by one Newton-Raphson iteration, which is truncated to k+1 bits.

In other embodiments, the approximate value may be generated by performing piecewise linear approximation on Y, looking up Y in bipartite tables, or looking up Y in multipartite tables.

Figure 3:
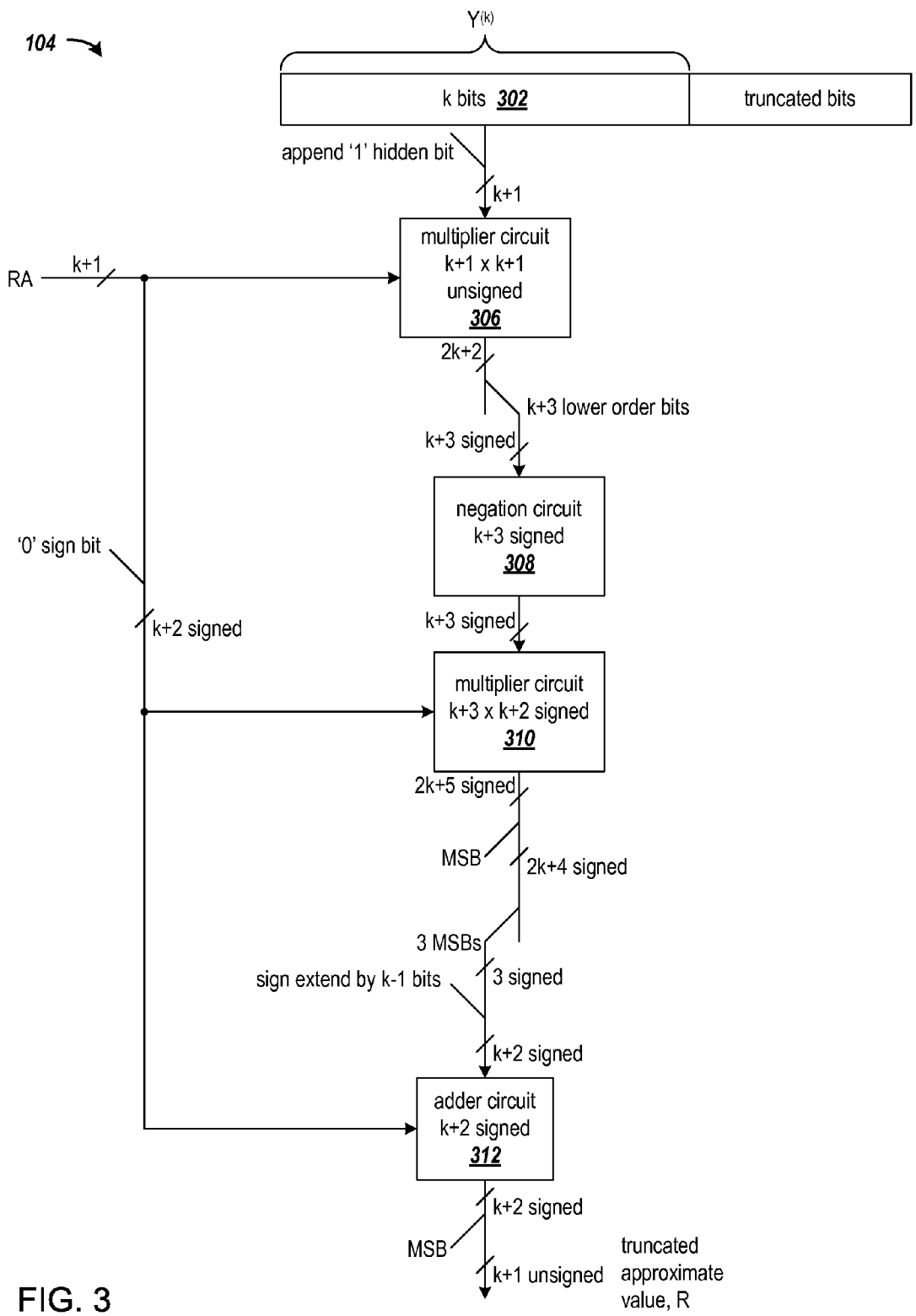
FIG. 3 is a diagram of a circuit for performing one Newton-Raphson iteration.

FIG. 3 is a diagram of a circuit for performing one Newton-Raphson iteration. The inputs to the Newton-Raphson circuit 104 are the approximate value RA from the initial approximation circuit 102 and $Y^{(k)}$ (k bits 302). The calculation performed by the Newton-Raphson circuit is $R=RA+RA*(1-(Y^{(k)}*RA))$, which is implemented with multiplier circuit 306, negation circuit 308, multiplier circuit 310, and adder circuit 312.

The inputs to multiplier circuit 306 are the k+1 bits of RA and $Y^{(k)}$, to which a "1" bit is appended as a hidden bit (the MSB). Multiplier circuit 306 multiplies unsigned values and is k+1 bits by k+1 bits. The multiplier circuit 306 outputs a product that is 2k+2 bits. The k+3 lower order bits of the 2k+2 bit product are provided as signed input to the negation circuit 308. The negation circuit outputs a signed value, which is k+3 bits.

The value output from negation circuit 308 is input to the signed multiplier circuit 310. A "0" sign bit is added to the k+1 bits of the approximate value RA, and the resulting k+2 bits are provided as the second signed input to the multiplier circuit 310. The product output by the multiplier circuit 310 is a signed value represented by 2k+5 bits. The MSB of the 2k+5 bits is ignored, leaving a signed value represented by 2k+4 bits. From the 2k+4 bits, the 3 MSBs are taken as a signed value, and the 3-bit value is sign-extended by k−1 bits. The resulting signed value, which is represented by k+2 bits, is provided as one input to the adder circuit 312. The other signed value to the adder circuit is the signed RA value represented by the k+2 bits. The sum output by the adder circuit is a signed value represented by k+2 bits. The MSB of the signed value is ignored, leaving an unsigned value that is the truncated approximate value R, which is represented by k+1 bits.

Figure 4:
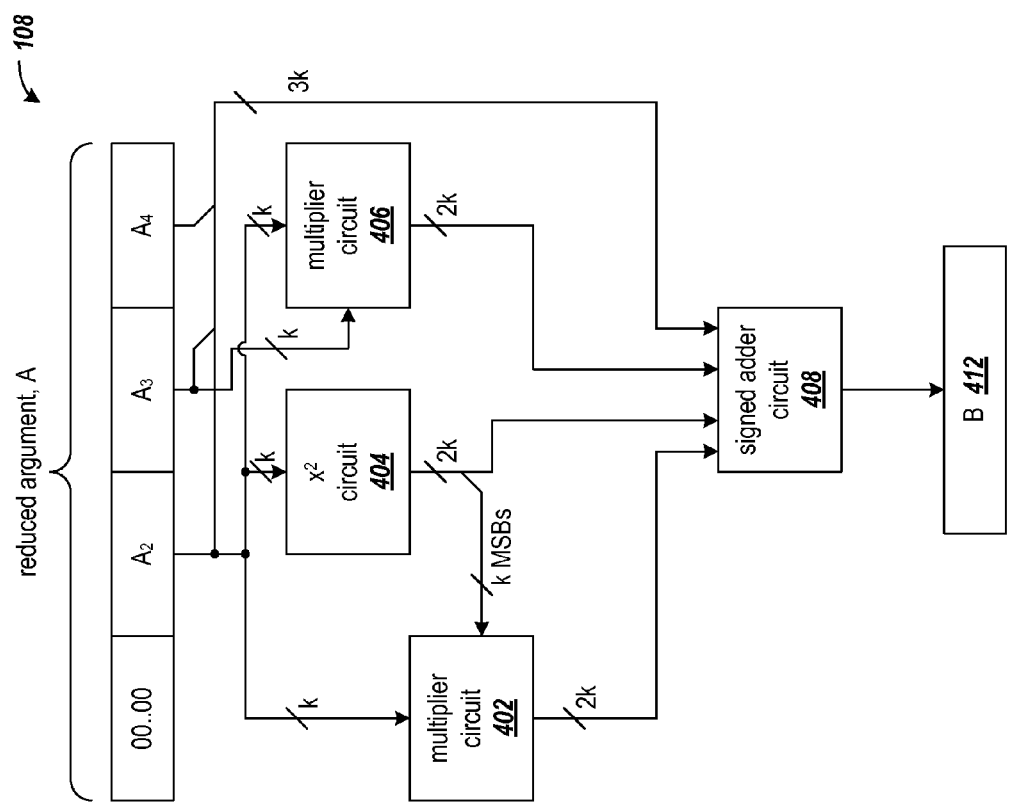
FIG. 4 is a diagram of a circuit for performing a Taylor series expansion of an input value.

FIG. 4 is a diagram of a circuit for performing a Taylor series expansion of an input value. The input to the Taylor series evaluation circuit 108 is reduced argument A, which as described above is the product of the truncated approximate value R from the Newton-Raphson circuit 104 and the input value Y minus 1 (A=Y*R−1). In the example, the reduced argument A is divided into 4, k-bit segments labeled as 00..00, $A_2$, $A_3$, and $A_4$. The notation "00..00" represents "0" bits in the k-bit segment. The notation $A_2$, $A_3$, and $A_4$ is also used to refer to the values represented by the k-bit segments.

The Taylor series evaluation circuit 108 includes multiplier circuit 402, squaring circuit 404, multiplier circuit 406, and signed adder circuit 408. Squaring circuit 404 inputs the k bits of $A_2$ and outputs 2k bits that represent $A_2^2$. The k highest-order bits of $A_2^2$ are provided as one input to multiplier circuit 402, and the k bits of $A_2$ are provided as the other input. The product output by multiplier circuit 402 is $A_2^3$.

Multiplier circuit 406 multiplies the k-bit values $A_2$ and $A_3$ and outputs the value $A_2A_3$ that is represented by 2k bits. The signed adder 408 has 4 inputs, $A_2^3$, $A_2^2$, $A_2A_3$ and $A_{2,3,4}$. The adder circuit calculates the value of B, rounded to 4k bits, as follows:

$$B = 1 + C_1 A_{2,3,4} + C_2 A_2^2 z^4 + 2 C_2 A_2 A_3 z^5 + C_3 A_2^3 z^6$$

where $C_1$, $C_2$ and $C_3$ depend on the function. Table 1 below shows the values of $C_1$, $C_2$ and $C_3$ for the different functions.

TABLE 1

| Function | $C_1$ | $C_2$ | $C_3$ |
| --- | --- | --- | --- |
| Reciprocal | 1 | 1 | 1 |
| Square root | 1/2 | −1/8 | 1/16 |
| Inverse square root | −1/2 | 3/8 | −5/16 |
| Logarithm | 1 | −1/2 | 1/3 |
| Exponential | 1 | 1/2 | 1/6 |

The $z^n$ terms indicate an alignment by shifting right n*k bits (i.e., adding n*k '0' MSBs). The output B of adder circuit 408 is stored in storage element 412, (e.g., a register).

Figure 5:
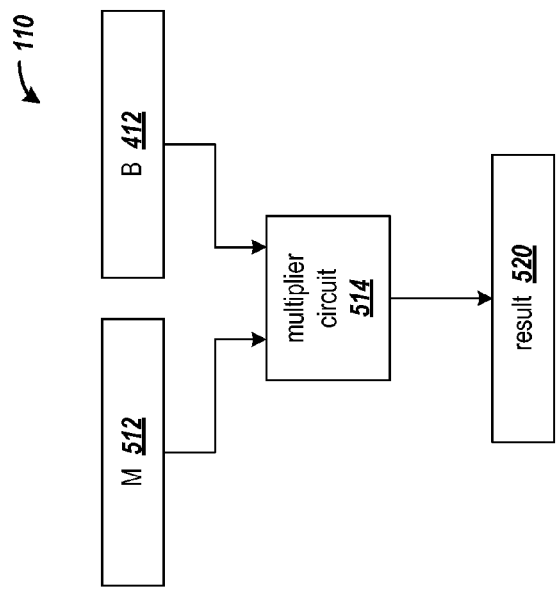
FIG. 5 is a diagram of a circuit for generating a final result of the evaluated function based on output of the Taylor series expansion and a factor, M.

FIG. 5 is a diagram of a circuit for generating a final result of the evaluated function based on output of the Taylor series expansion and a factor, M. The post-processing circuit 110 includes multiplier circuit 514, which multiplies the evaluated argument B from register 412 by a post-processing factor, M from register 512 and stores the result in register 520. The value of M and the number of bits used to represent M depend on the function performed (reciprocal, square root, inverse square root, logarithm, exponential). For the reciprocal function, k+1 bits are used to represent M; for the square root, inverse square root, logarithm and exponential functions, 4k bits are used to represent M.

In one embodiment, the value B output from circuit 108 of FIG. 4 is 4k bits wide, which supports an implementation in which multiplier circuit 514 calculates M*B. In an alternative embodiment, the adder circuit 408 of FIG. 4 does not add the "1" term in the calculation of B, and B-hat is the output of adder circuit 408 (B=B-hat+1). In this implementation, the multiplier circuit 514 calculates M*B-hat+M, which allows a smaller circuit implementation than M*B since B-hat has 3k+1 bits in comparison to B having 4k bits. It will be appreciated that M*B=M*B-hat+M.

Figure 6:
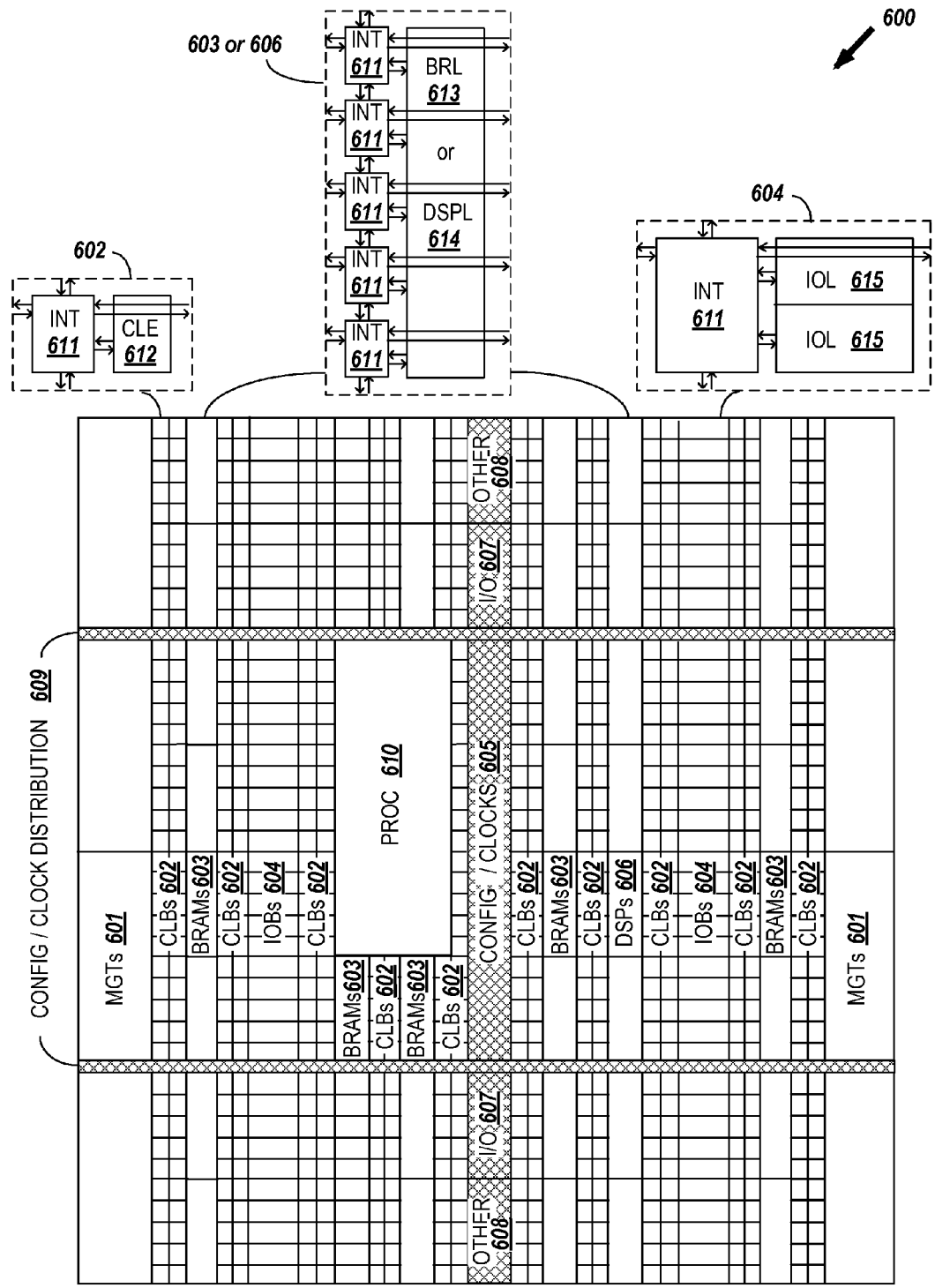
FIG. 6 is a block diagram of an example programmable logic integrated circuit that may be used in implementing the circuitry described herein.

FIG. 6 is a block diagram of an example programmable logic integrated circuit 600 that may be used in implementing the circuitry described herein. A circuit for evaluating reciprocal, square root, inverse square root, exponential, and logarithmic functions of an input value, as previously described, may be implemented on the programmable logic and interconnect resources of a programmable integrated circuit.

FPGAs can include several different types of programmable logic blocks in the array. For example, FIG. 6 illustrates an FPGA architecture (600) that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607), for example, e.g., clock ports, and other programmable logic 608 such as digital clock managers, analog-to-digital converters, system monitoring logic, and so forth. Some FPGAs also include dedicated processor blocks (PROC 610) and internal and external reconfiguration ports (not shown).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic plus a single programmable interconnect element INT 611. A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element INT 611. As will be clear to those of skill in the art, the actual I/O pads connected, for example, to the I/O logic element 615 are manufactured using metal layered above the various illustrated logic blocks, and typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear, to facilitate the efficient implementation of user logic.

In one or more embodiments, the circuitry can be used for floating point or fixed point versions of the functions. For floating point versions, the sign, exponent, and mantissa are computed separately and combined at the end. The mantissa calculation becomes a computation of the fixed point function with the input number in the range of $1.0<=Y<2.0$. Therefore, the mantissa calculation of the floating point version can be used separately for the equivalent fixed point version.

The embodiments are thought to be applicable to a variety of systems that compute reciprocal, square root, and inverse square root functions. Other aspects and embodiments will be apparent to those skilled in the art from consideration of the specification. The embodiments may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A method for evaluating a function of an input value, Y, comprising:
   generating an approximate value, RA, of the reciprocal of Y by an initial approximation circuit;
   performing by a Newton-Raphson circuit, one Newton-Raphson iteration, resulting in a truncated approximate value, R;
   wherein the performing of the one Newton-Raphson iteration includes:
      multiplying RA and k most significant bits of Y by a k+1 by k+1 bit multiplier circuit, resulting in a first product;
      negating k+3 lower order bits of the first product by a negation circuit, resulting in a k+3 bit signed multiplicand;
      multiplying the signed multiplicand and RA combined with a sign bit by a k+3 by k+2 multiplier circuit, resulting in a signed product;
      selecting a number of most significant bits of the signed product and sign-extending the selected number of most significant bits, resulting in a signed addend; and
      adding RA combined with the sign bit and the signed addend by a k+2 bit signed adder circuit, resulting in a k+2 bit signed sum, wherein k+1 lower order bits of the signed sum are the truncated approximate value, R;
   multiplying R by Y and subtracting 1 by a reduction circuit, resulting in a reduced argument, A;
   performing a Taylor series evaluation of A by a Taylor series evaluation circuit, resulting in an evaluated argument, B; and
   multiplying B by a post-processing factor by a first multiplier circuit and outputting a final product by the first multiplier circuit.

2. The method of claim 1, wherein the function is a reciprocal, and the post-processing factor is R.

3. The method of claim 1, wherein the function is a square root, and the post-processing factor is a reciprocal of a square root of R.

4. The method of claim 1, wherein the function is an inverse square root, and the post-processing factor is a square root of R.

5. The method of claim 1, wherein the function is one of a logarithm or an exponential function, and the post-processing factor is one of $-\ln(R)$ or $\exp(1+A_1 2^{-k})$, respectively, wherein $A_1$ is k bits of A and $k>1$.

6. The method of claim 1, wherein the generating of the approximate value, RA, includes:
   truncating a number of least significant bits of Y, leaving k bits;
   reading a value from a memory as addressed by m most significant bits of Y;
   negating least significant k−m bits of the k bits by an inverter circuit, resulting in an inverted value; and
   multiplying the inverted value by the value read from the memory by a second multiplier circuit, resulting in RA.

7. The method of claim 1, wherein the generating of the approximate value, RA, includes reading Y from memory.

8. The method of claim 1, wherein the generating of the approximate value, RA, includes performing piecewise linear approximation on Y.

9. The method of claim 1, wherein the generating of the approximate value, RA, includes looking up Y in bipartite tables.

10. The method of claim 1, wherein the generating of the approximate value, RA, includes looking up Y in multi-partite tables.

11. A circuit for evaluating a function of an input value, Y, comprising:
   an initial approximation circuit configured and arranged to generate an approximate value, RA, of the reciprocal of Y;
   a Newton-Raphson circuit coupled to the initial approximation circuit, the Newton-Raphson circuit configured and arranged to perform one Newton-Raphson iteration as a function of RA and Y and output a truncated approximate value, R;
   wherein the Newton-Raphson circuit includes:
      a k+1 by k+1 bit multiplier circuit arranged to multiply RA and k most significant bits of Y and output a first product;
      a negation circuit arranged to negate k+3 lower order bits of the first product and output a k+3 bit signed multiplicand;
      a k+3 by k+2 multiplier circuit arranged to multiply the signed multiplicand and RA combined with a sign bit and output a signed product;
      a k+2 bit signed adder circuit arranged to add RA combined with the sign bit and a signed addend, the signed addend being a sign extended number of most significant bits of the signed product, and the k+2 bit signed adder circuit arranged to output a k+2 bit signed sum, wherein k+1 lower order bits of the signed sum are the truncated approximate value, R;
   a reduction circuit coupled to the Newton-Raphson circuit, the reduction circuit configured and arranged to multiply R by Y and subtract 1 and output a reduced argument, A;
   a Taylor series evaluation circuit coupled to the reduction circuit, the Taylor series evaluation circuit configured and arranged to perform a Taylor series evaluation of A and output an evaluated argument, B; and
   a first multiplier circuit coupled to the Taylor series evaluation circuit, the first multiplier circuit configured and arranged to multiply B by a post-processing factor and output a final product.

12. The circuit of claim 11, wherein the function is a reciprocal, and the post-processing factor is R.

13. The circuit of claim 11, wherein the function is a square root, and the post-processing factor is a reciprocal of a square root of R.

14. The circuit of claim 11, wherein the function is an inverse square root, and the post-processing factor is a square root of R.

15. The circuit of claim 11, wherein the initial approximation circuit includes:
- a read-only memory configured with a plurality of approximate values;
- a negation circuit; and
- a second multiplier circuit coupled to the read-only memory and to the negation circuit;

wherein:
- the initial approximation circuit is further configured and arranged to:
  - input k higher order bits of Y; and
  - read a value from the read-only memory as addressed by m most significant bits of Y;
- the negation circuit is configured and arranged to negate least significant k−m bits of the k bits, resulting in an inverted value; and
- the second multiplier circuit is configured and arranged to multiply the inverted value by the value read from the read-only memory, resulting in RA.

16. The circuit of claim 11, wherein the initial approximation circuit is further configured and arranged to perform piecewise linear approximation on Y.

17. The circuit of claim 11, wherein the initial approximation circuit is further configured and arranged to look up Y in bipartite tables.

18. The circuit of claim 11, wherein the initial approximation circuit is further configured and arranged to look up Y in multi-partite tables.

19. The circuit of claim 11, wherein one or more of the initial approximation circuit, the Newton-Raphson circuit, the reduction circuit, the Taylor series evaluation circuit, and the first multiplier circuit are implemented in programmable logic circuitry.

20. The circuit of claim 11, wherein one or more of the initial approximation circuit, the Newton-Raphson circuit, the reduction circuit, the Taylor series evaluation circuit, and the first multiplier circuit are implemented in a digital signal processing circuitry in a field programmable gate array.

* * * * *